United States Patent
Castonguay

(10) Patent No.: US 7,808,654 B1
(45) Date of Patent: Oct. 5, 2010

(54) HIGH RESOLUTION THREE DIMENSIONAL TOPOGRAPHY USING A FLATBED SCANNER

(75) Inventor: Raymond Joseph Castonguay, Tucson, AZ (US)

(73) Assignee: Engineering Synthesis Design, Inc., Tucson, AZ (US)

( * ) Notice: Subject to any disclaimer, the term of this patent is extended or adjusted under 35 U.S.C. 154(b) by 301 days.

(21) Appl. No.: 12/136,746

(22) Filed: Jun. 10, 2008

Related U.S. Application Data

(60) Provisional application No. 60/934,212, filed on Jun. 11, 2007.

(51) Int. Cl.
*G01B 11/24* (2006.01)
(52) U.S. Cl. ...................................... 356/601
(58) Field of Classification Search ........................ None
See application file for complete search history.

(56) References Cited

U.S. PATENT DOCUMENTS

2006/0228010 A1* 10/2006 Rubbert et al. ............... 382/128
2007/0296979 A1* 12/2007 Morimoto et al. ........... 356/609

* cited by examiner

*Primary Examiner*—Tu T Nguyen
(74) *Attorney, Agent, or Firm*—Hayes Soloway P.C.

(57) ABSTRACT

An optical measuring apparatus for measuring 3D surface profiles of an object comprising, in combination: a linear detector array; an imaging system including a light source to image the object onto the detector array; and machine readable software for producing a 3D topology map from a 2D image, wherein the apparatus is calibrated by changing the optical focus distance between the detector array and the object for the purpose of 3D measurement calibration, and changing the relative lateral positions between the detector array and the object for the purpose of scanning the object's surface.

14 Claims, 1 Drawing Sheet

HIGH RESOLUTION THREE DIMENSIONAL TOPOGRAPHY USING A FLATBED SCANNER

CROSS REFERENCE TO RELATED APPLICATION

This application claims priority from U.S. Provisional Application 60/934,212 filed Jun. 11, 2007, the contents of which are incorporated herein by reference.

FIELD OF INVENTION

The present invention relates to three dimensional surface metrology. The invention has particular utility in the measurement of three dimensional (3D) surface profiles of objects using a two dimensional (2D) optical scanner, and will be described in connection with such utility, although other utilities are contemplated.

BACKGROUND OF INVENTION

Many prior art methods such as interferometers, mechanical probe profilometers, laser scanners, and confocal microscopes are used today to measure three dimensional topology of surfaces. These methods compromise between height resolution, spatial resolution, and time of measurement. Instruments that have very high height resolution have low spatial resolution or take extremely long periods of time to measure large surface areas. The present invention achieves high sub-nanometer 3D height resolution, micron spatial resolution, and can measure large surfaces, such as a 300 mm wafer, using a flat bed scanner, in a matter of minutes.

SUMMARY OF INVENTION

The present invention uses a flat bed scanner apparatus to perform 3D topology imaging of a sample surface height using a non-coherent source such as a white light source or a monochromatic light source by calibrating the apparatus by changing the optical focus distance between the detection array and the sample surface, and computing the sample surface 3D surface using 3D measurement calibration techniques.

More particularly, in accordance with one embodiment of the invention there is provided an optical measuring apparatus for measuring 3D surface profiles of an object comprising in combination:

a linear detector array;

an imaging system including a light source to image the object onto the detector array; and machine readable software for producing a 3D topology map from a 2D image, wherein the apparatus is calibrated by changing the optical focus distance between the detector array and the object for the purpose of 3D measurement calibration, and changing the relative lateral positions between the detector array and the object for the purpose of scanning the object's surface.

In one embodiment the detector array comprise pixilated detectors, e.g. such as in a flatbed scanner.

The optical focus distance may be changed by moving the object, or by moving the imaging system and the detector array or by moving the object, the imaging system and the detector array.

In another embodiment, the relative lateral position is changed by moving the object, or by moving the imaging system and detector array, or by moving the object, the imaging system and the detector array.

If desired, the linear detector array may be replaced with three linear detector arrays where each is associated with different wavelengths of light, e.g. red, green, and blue.

In another embodiment the optical focus distance may be changed to a number of predetermined positions, and data collected from the detector array is sent to a computer for the purpose of 3D measurement calibration.

The present invention also provides an apparatus for measuring an object wherein:
   the relative lateral position is changed to scan the object.
   the scanned object data is sent to a computer, and
   the 3D measurement calibration is used to compute the object's three dimensional surface profile.

BRIEF DESCRIPTION OF THE DRAWINGS

Further features and advantages of the present invention will be seen from the following detailed description taken in conjunction with the accompanying drawings, wherein like numerals depict like parts, and wherein.

DETAILED DESCRIPTION OF PREFERRED EMBODIMENT

Figure 1:
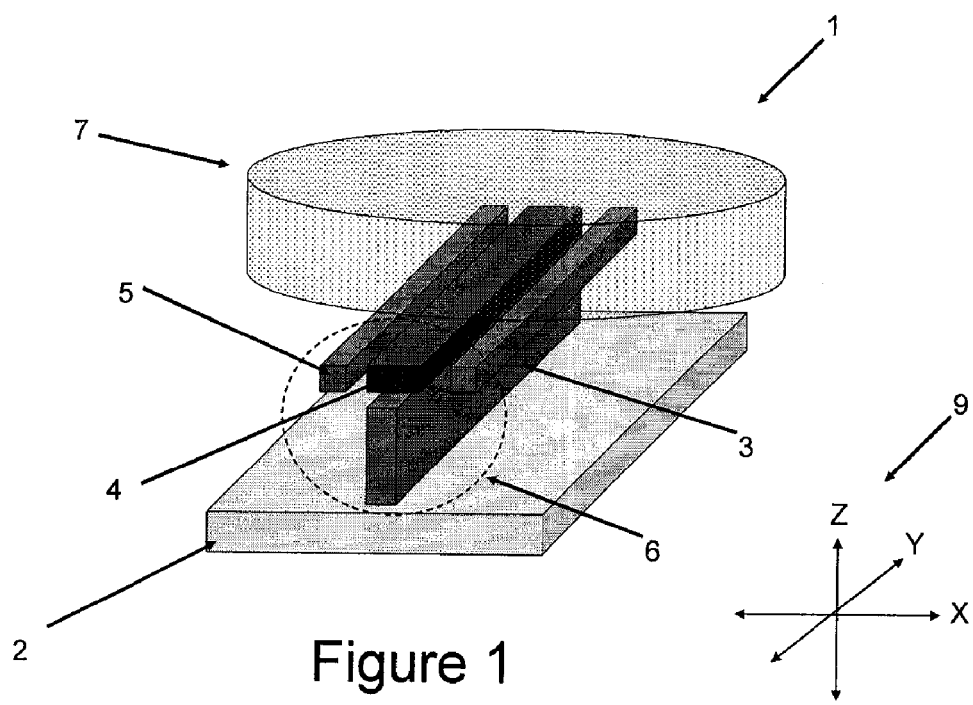
FIG. 1 schematically illustrates an optical measuring apparatus in accordance with the present invention.

The present invention uses a flatbed scanner 1 shown in FIG. 1. The test surface 7 to be measured is measured by scanning a linear array of light detectors 3, imaging optics 4, and illumination source 5, herein collectively called the imager 6, across the sample 7. The imager 6 is structurally supported by a base 2. For instrument calibration, the light path distance between sample 7 and detector 3 is changed by moving one or both the sample and the detector. That is to say, the light path distance, in the z—direction as shown by compass 9, is changed by moving the sample 7, and/or moving the imager 6, and/or moving the optics 4, and/or moving the linear detector array 3. The present invention advantageously uses commercially available software to process images from a flat bed scanner and convert the images into three-dimensional topology. Particularly preferred is GetPhase software available commercially from PhaseView of Palaiseau, France, and on the internet. PhaseView software is designed to produce a three dimensional topology map from a single image using a non-coherent light source. According to the manufacturer, GetPhase software can be used with a conventional microscope or stereomicroscope. However, conventional microscopes and stereomicroscopes have extremely narrow fields of view. In the preferred embodiment of the invention, it is possible to measure 3D surface profiles of an object using a linear detector array such as a flatbed scanner after suitable 3D calibration Light propagation can be described by electric and magnetic vectors that fluctuate in directions perpendicular to each other and to the direction of the beam. These vectors satisfy a set of fundamental Maxwell partial differential equations describing how the variation in the electric vector influences the value of the magnetic field vector, and vice versa. The PhaseView software uses efficient methods of solving systems of differential equations that govern the light energy propagation that is described by the vector quantity, namely the Poynting's vector. This technology decouples the spatial variation of the electromagnetic power and the 3D surface shape of the illuminated object. The phase information is required to reconstruct the 3D surface shape of the measured object.

The basic procedure of the process is: Measuring the variation of EM field intensity; couple the intensity variation to the phase; then, scale the phase to represent the 3D surface shape. Heretofore, the PhaseView software has only been used with images captured from cameras attached to microscopes. This limits the size of objects that can be measured. The present invention makes advantageous use of PhaseView software with a flat bed scanner apparatus by calibrating the scanner apparatus. To calibrate the scanner apparatus and the PhaseView software, several images are scanned at multiple distances between the test surface and the detector. Once these images are acquired, a calibration database is generated and saved. This calibration needs to be performed only once. Prior art non-coherent 3D surface metrology instruments require scanning in all three (x-y-z) directions to acquire data over large surfaces for every object measured. With the PhaseView calibration complete, the present invention can generate three dimensional topology maps of large surfaces from a single lateral scan. Thus the speed is orders of magnitude faster then conventional systems.

Figure 2:
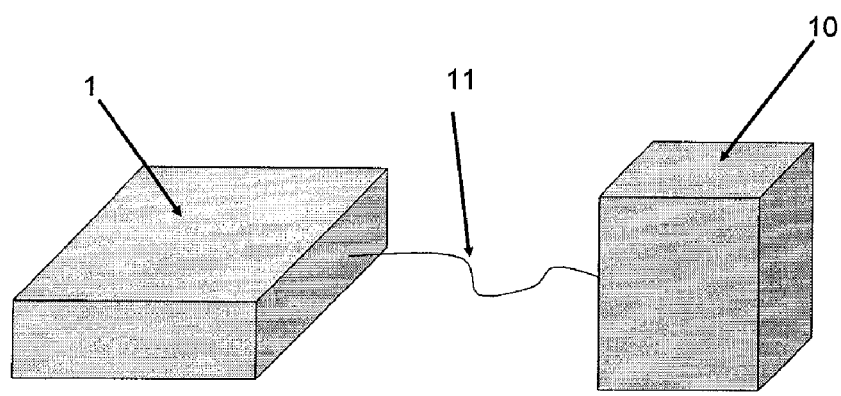
FIG. 2 illustrates an optical scanning system incorporating the optical measuring apparatus illustrated in FIG. 1.

FIG. 2 shows the scanner 1 connected by cable 11 to computer 10. The computer 10 controls the scanner 1 by sending appropriate commands. In FIG. 1, the imager 6 can be automated to scan in the x direction as shown by compass 9 across the surface 7, or the surface 7 and be scanned across the imager 6. The spatial resolution in the x-direction, as shown by compass 9, is governed by a motorized mechanism that moves imager 6 or surface 7. The spatial resolution in the y-direction, as shown by compass 9, is governed by the number of light detecting elements in detector array 3. The height resolution is governed by the combined optical system of imager 6 and sample 7 and the accuracy of the calibration procedure.

Calibration of the instrument 1 is performed by changing the distance between imager 6 and surface 7 in the z-direction, as shown by compass 9, which is equivalent to changing the optical focus of the system 1. At each focus position an image is acquired and stored on computer 10. These images are used to calibrate the system 1 for 3D surface measurements of surface 7. Once the system 1 is calibrated, only one scan in the x-direction is needed to generate large three dimensional topology profiles of the entire surface 7.

In a preferred embodiment of the invention, the detector 3, comprises an array of three rows of linear detector arrays. Each of the three linear arrays will have colored filters in the optics 4 or embedded in detector array 3 to decompose the scanned image into three colors such as red, green, and blue. This would allow 3D topology measurements to be computed more precisely or for surface topology to be measured as a function of light wavelength.

Although the preferred invention uses a non-coherent light source, it is not intended to be limited to a specific light source.

What is claimed:

1. An optical measuring apparatus for measuring 3D surface profiles of an object comprising, in combination:
a linear detector array;
an imaging system including a light source to image the object onto the detector array; and
machine readable software for producing a 3D topology map from a 2D image, wherein the apparatus is calibrated by changing the optical focus distance between the detector array and the object for the purpose of 3D measurement calibration, and changing the relative lateral positions between the detector array and the object for the purpose of scanning the object's surface.

2. The apparatus of claim 1, wherein the detector array comprise pixilated detectors.

3. The apparatus of claim 1, wherein the apparatus is a flatbed scanner.

4. The apparatus of claim 1, wherein the optical focus distance is changed by moving the object.

5. The apparatus of claim 1, wherein the optical focus distance is changed by moving the imaging system and the detector array.

6. The apparatus of claim 1, wherein the optical focus distance is changed by moving the object, the imaging system and the detector array.

7. The apparatus of claim 1, wherein the relative lateral position is changed by moving the object.

8. The apparatus of claim 1, wherein the relative lateral position is changed by moving the imaging system and detector array.

9. The apparatus of claim 1, wherein the relative lateral position is changed by moving the object, the imaging system and the detector array.

10. The apparatus of claim 1, wherein the linear detector array is replaced with three linear detector arrays where each is associated with different wavelengths of light.

11. The apparatus of claim 10, wherein the wavelengths of light are red, green, and blue.

12. The apparatus of claim 1, wherein the optical focus distance is changed to a number of predetermined positions, and data collected from the detector array is sent to a computer for the purpose of 3D measurement calibration.

13. The apparatus of claim 12, for measuring an object wherein:
the relative lateral position is changed to scan the object,
the scanned object data is sent to a computer, and
the 3D measurement calibration is used to compute the object's three dimensional surface profile.

14. The apparatus of claim 1, wherein the light source comprises a non-coherent light source.

* * * * *